United States Patent [19]
Durand et al.

[11] Patent Number: 5,159,881
[45] Date of Patent: Nov. 3, 1992

[54] METHOD AND SYSTEM FOR DAMPING THE OSCILLATORY MOTIONS OF RAILWAY VEHICLES

[76] Inventors: Charles R. Durand; Jérôme C. Durand, both of Château de Lingourdy, Le Bodio, Corlay, France, 22320

[21] Appl. No.: 613,646
[22] PCT Filed: May 31, 1989
[86] PCT No.: PCT/FR89/00266
   § 371 Date: Dec. 20, 1990
   § 102(e) Date: Dec. 20, 1990
[87] PCT Pub. No.: WO89/11991
   PCT Pub. Date: Dec. 14, 1989

[30] Foreign Application Priority Data
   Jun. 3, 1988 [FR] France .................. 88 07418

[51] Int. Cl.⁵ ............................ B61B 12/00
[52] U.S. Cl. .................................. 105/199.2
[58] Field of Search ............... 105/199.1, 199.2, 453; 180/165; 280/6.12, 755, 704

[56] References Cited

U.S. PATENT DOCUMENTS

| | | |
|---|---|---|
| 3,906,869 | 9/1975 | Dobson et al. |
| 4,069,767 | 1/1978 | Glaze .................. 105/199.2 |
| 4,440,093 | 4/1984 | Kake .................... 105/199.2 |
| 4,480,555 | 11/1984 | Shafer et al. .......... 105/199.2 |
| 4,715,289 | 12/1987 | Okamoto et al. ........ 105/199.2 |

FOREIGN PATENT DOCUMENTS

| | | |
|---|---|---|
| 2001282 | 7/1970 | Fed. Rep. of Germany . |
| 2531921 | 8/1983 | France . |
| 2574036 | 12/1984 | France . |
| 2176162A | 5/1986 | United Kingdom . |
| 9100815 | 1/1991 | World Int. Prop. O. ...... 105/199.2 |

Primary Examiner—Robert J. Oberleitner
Assistant Examiner—Mark T. Le
Attorney, Agent, or Firm—Jacobson, Price, Holman & Stern

[57] ABSTRACT

A damping system for calming the motions of elements of railway vehicles, having a pulsating character such as the bodies or the axles, by damping devices includes an accelerometer (14) responsive to the direction of the motion to be damped, a circuit (18) for processing the signal issuing from the accelerometer and a hydraulic double-acting cylinder (12) interposed between the body and rolling element, a reservoir of oil under pressure (26) in selective communication with one or the other of the chambers of the cylinder (12) in response to signals delivered by the processing circuit (18), and a device for automatically regenerating at least a part of the energy or pressure in the oil reservoir by the relative motions between the body and rolling element.

15 Claims, 6 Drawing Sheets

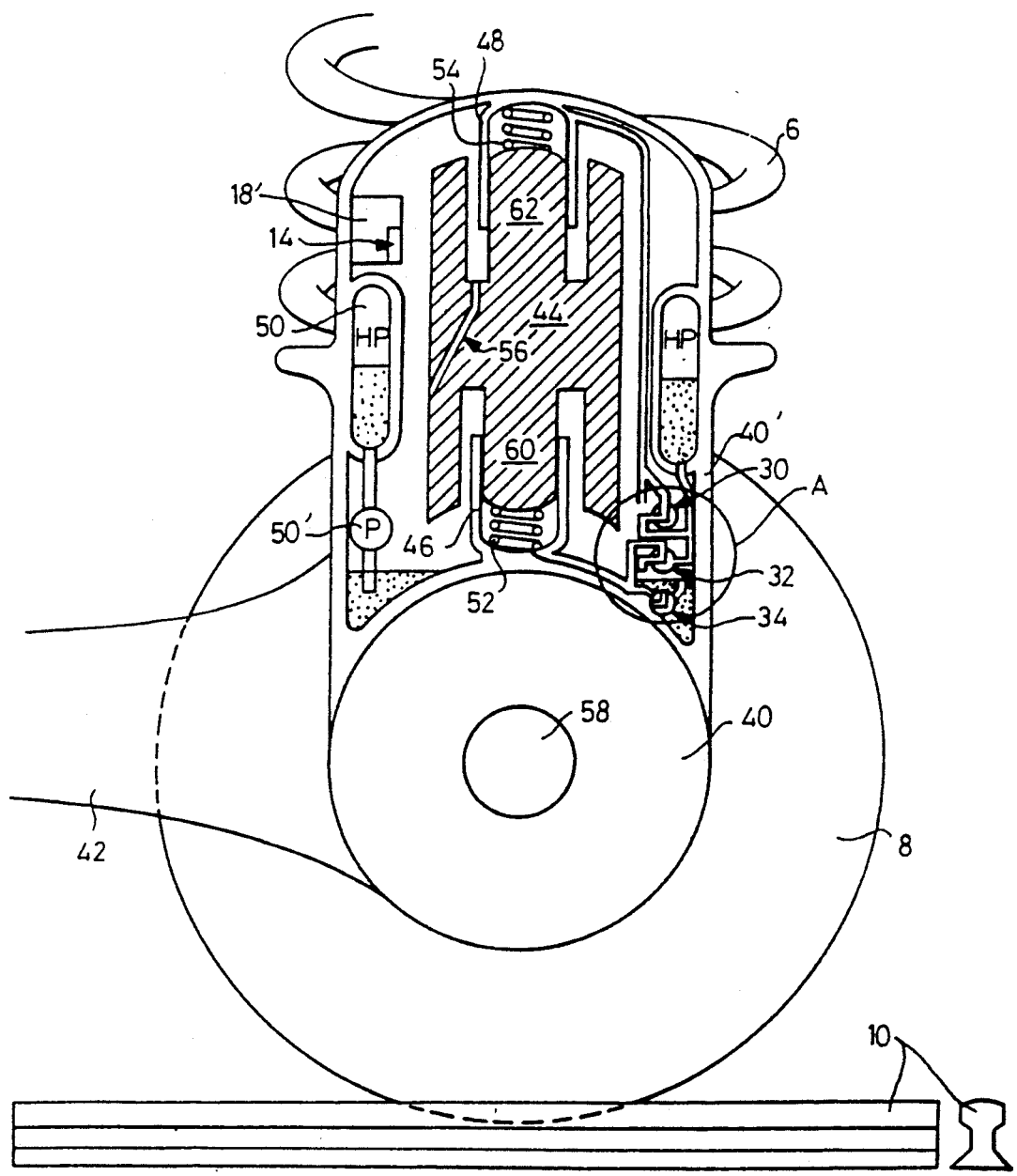

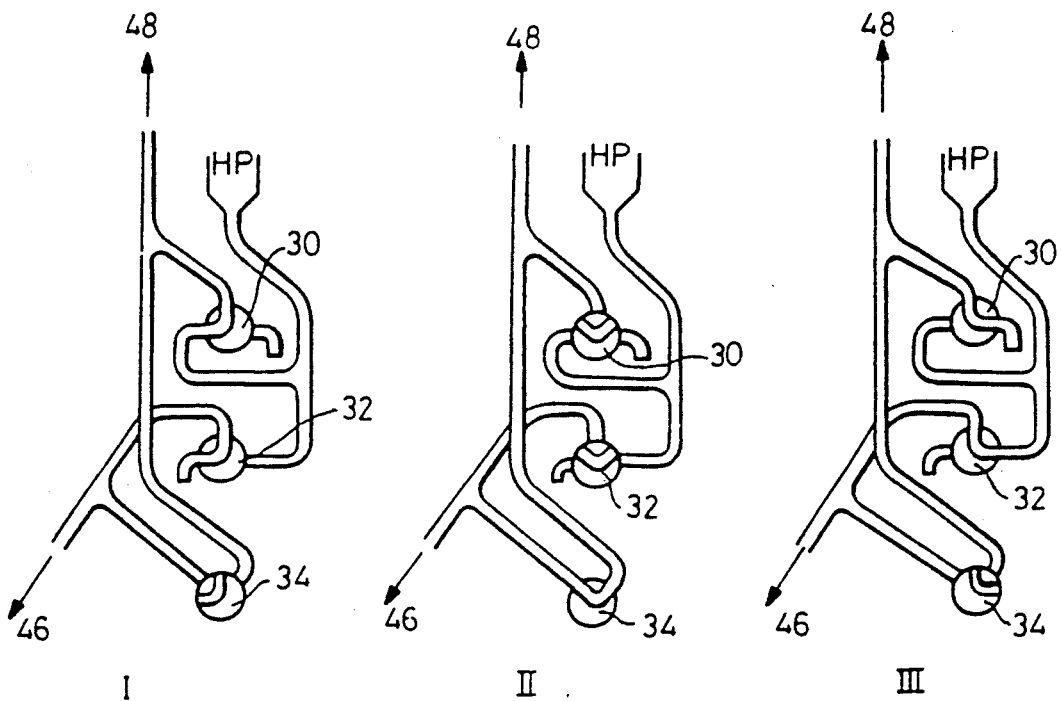
FIG_4A
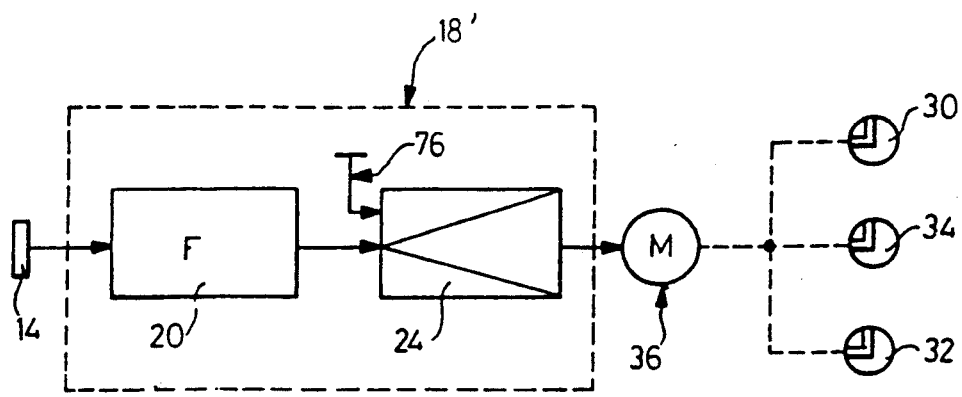
FIG_5

METHOD AND SYSTEM FOR DAMPING THE OSCILLATORY MOTIONS OF RAILWAY VEHICLES

This application relates to copending U.S. patent application Ser. No. 07/623,722, filed Dec. 21, 1990 now pending in the names of the same inventors.

BACKGROUND OF THE INVENTION

The present invention relates to the railway vehicle industry and more particularly to a process and a system capable of calming the oscillatory motions of the railway vehicle body independently of the disturbances created by the geometrical imperfections of the rails.

French Patent filed on Dec. 3, 1984 under the No. 84-18377 (2,574,036) describes a damping device for the body of a railway vehicle based on the measurement of the body acceleration and the direction of the relative displacement between the body and the rolling element. It consists of reducing—or even eliminating—the action of the dampers placed between the body and the rolling element during the phases of the motion during which the action of these dampers, if it were maintained, would result in maintaining the pulsating motions rather than suppressing them owing to the motions pertaining to the rolling element to which these dampers are attached.

BRIEF SUMMARY OF THE INVENTION

The present invention constitutes an improvement of the device described in the aforementioned patent in that the device may act in a quasi-continuous manner owing to the use of an energy accumulator having a regeneratable energy and to the use of a double-acting cylinder instead of a single switchable damper. Relative to the device described in the aforementioned patent, the present device is moreover simplified by the fact that it no longer requires a detector of the direction of the relative motion of the body relative to the rolling element against which the cylinder bears.

In an advantageous form of the invention, the system is integrated into each wheel bearing of the vehicle and, in this latter case, it permits not only calming the oscillatory motions of the body but also reducing the transmission of the forces between the body and the rail to solely the transmission of the weight to the respective wheel.

The invention also provides a process for calming the motions of railway vehicle elements having a pulsating character, such as the bodies or the axles, by means of a damping device comprising an accelerometer responsive to the direction of the motion to be calmed, a circuit for processing the signal issuing from the accelerometer and a hydraulic double-acting cylinder interposed between the body and the rolling element, characterized by selectively feeding one or the other of the chambers of the cylinder in response to the signals delivered by the processing circuit, from a reservoir of oil under pressure, and automatically regenerating a part of the energy prevailing in the reservoir by the relative motions between the body and the rolling element.

BRIEF DESCRIPTION OF THE DRAWINGS

A better understanding of the invention will be possible from a reading of the following detailed description with reference to the accompanying drawings which represent, by way of example, the manner in which may be calmed for each truck (or axle), the pulsating vertical motion of the body, it being of course understood that the invention may be applied to all of the pulsating motions of the body i.e. sway-roll, yaw and pitch motions, and wherein:

FIG. 4 is a schematic longitudinal cross-sectional view of an example of the mechanical compensating device according to the invention;

FIG. 4A shows schematic views which illustrate at I, II, and III the different possible positions taken up by the boisseaux seen in detail A of FIG. 4;

FIG. 5 is a diagrammatic view of the electronic part which completes the control adapted to eliminate the forces of inertia exerted on the respective axle.

DETAILED DESCRIPTION

Figure 1:
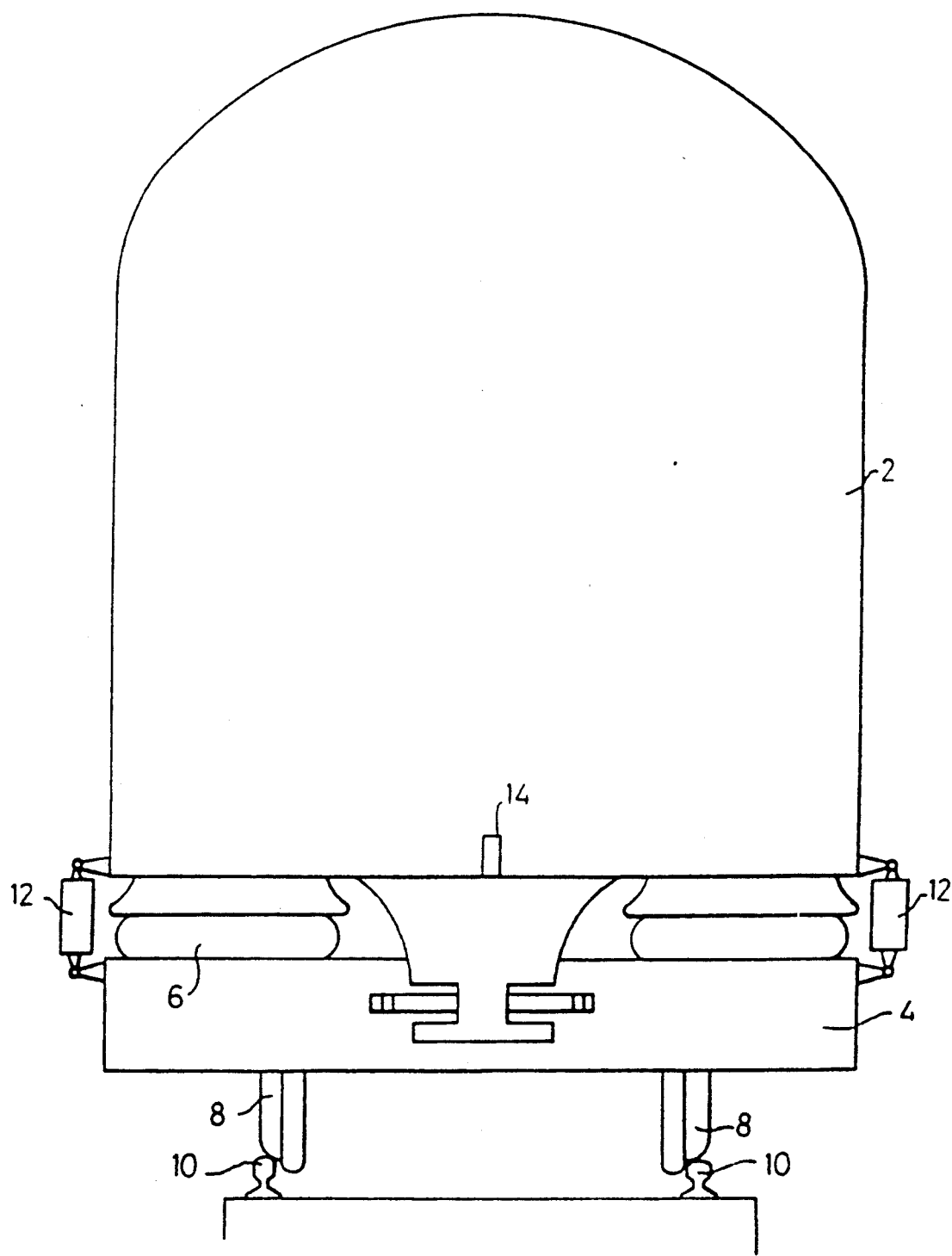
FIG. 1 is a schematic cross-sectional view of a railway body and its truck.

Shown in FIG. 1 is the body 2 of a railway vehicle mounted on a truck chassis 4 through a suspension 6. The chassis 4 is itself supported on wheels 8 which roll along the rails 10. A double-acting cylinder 12 is connected in parallel with each of the body suspensions 6 and constitutes the power element of the control which must calm in the considered case the vertical motions of the body about the mean position.

Figure 2:
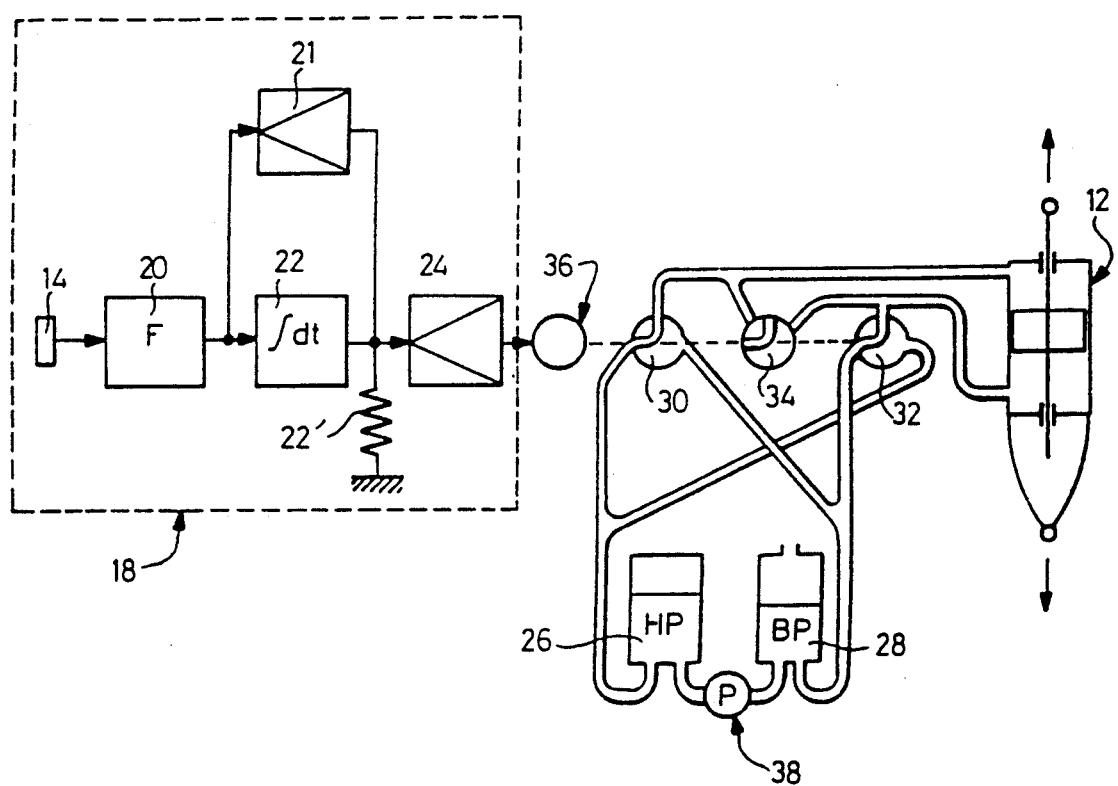
FIG. 2 is a diagrammatic view of the control system of a device according to the invention.

Shown in FIG. 2 is an accelerometer 14 having a substantially vertical axis and serving to determine, in association with its processing circuit, the intensity and the direction of the velocity vector corresponding to the absolute motion (with respect to the ground) of the body. The signal delivered by the accelerometer 14 is sent to a processing circuit 18 constituted by:

a) a branch, termed an integrating branch, comprising: possibly a filter 20, an integrator 22 with its discharge drain 22' permitting access to the velocity information, and a cropping amplifier 24.

This integrating branch unit functions to produce an output signal which represents the absolute vertical velocity of the body, as will be explained hereinafter:

b) a branch, termed an amplifying branch, derived from the output of the filter 20 and comprising an amplifier 21. This amplifier delivers a signal which is algebraically added to the input of the chopping amplifier 24 with that coming from the integrating branch.

The function of each of these integrating or merely amplifying branches will be explained hereinafter. Depending on whether the output signal of the processing circuit 18 is positive or negative, one or the other of the oil chambers of the cylinder 12 is put in communication with a reservoir 26 of oil under high pressure while the other chamber is put in communication with a reservoir 28 of oil under low pressure by means of directional-control valves 30 and 32 which are mechanically interconnected and actuated by a driving element 36 which is itself fed by the processing circuit 18.

If the output signal of this circuit is zero, the two chambers of the double-acting cylinder are put back into communication with each other by means of a directional-control valve 34 driven by the same mechanical connection as that which drives the directional-control valves 30 and 32. The directional-control valves 30, 32, 34 may be constituted by electrically operated valves actuated by the signals delivered by the amplifier 24.

The function of the two branches a) and b) is the following:

The integrating branch has the purpose of delivering to the chopper-amplifier 24 the signal required for calming the vertical body motions. This signal represents the vertical algebraic velocity of the body. Its introduction in the control amplifier 24 of the body constitutes what is considered to be a tachometric control in the servomechanism technique the purpose of which is to calm the vertical pulsating body motions (damping).

As concerns the amplifying branch, it serves to correct the elastic effect of the springs of the body suspension 6 by modifying the natural frequency of the body suspension. As the general tendency is to lower the natural frequency of the body suspension, a sign convention, and therefore a connecting mode, will be so chosen that the servo-mechanism opposes the action of the springs of the suspension 6 as will be clear from the following explanations with reference to FIG. 2.

If the absolute vertical velocity of the body is distinctly ascending or if the body acceleration is distinctly upwardly directed, the processing circuit delivers a signal of such sign that, owing to the driving element 36, the directional-control valves 30, 32 and 34 are put in the position represented in FIG. 2, which means that the high pressure is exerted on the upper side of the piston.

If during this phase of the motion the cylinder is extended (owing to the relative motion between the body and the rolling element) it deflates the high pressure reservoir 26. On the other hand, if the cylinder is compressed during this phase of the motion it delivers the oil to the reservoir which it reinflates.

When, inversely, the absolute motion of the body is distinctly descending or if the body acceleration is distinctly directed downwardly, the directional-control valves are positioned to feed the lower chamber of the cylinder with oil under high pressure.

Lastly, when, with the aforementioned sign conventions, the sum of the signals from the two branches is less than a certain threshold, the cropping amplifier 24 delivers a null signal and the directional-control valve 34 is so positioned as to put the two chambers of the cylinder in communication with each other. Under these conditions, the latter does not oppose an appreciable resistance to the relative motion between the body and the rolling element.

On a straight section of the track where the body has motions of small amplitude and, moreover, owing to energy supplies during certain phases of the motion, the reserve of energy to constitute in the high pressure reservoir is relatively small. After a prolonged stoppage, it reconstitutes itself after a few motions owing to the aforementioned pumping phenomenon.

Depending on the results of tests on the line, it can be decided whether it is advisable to install an automatic pump 38 which, as a complement to the natural pumping, will ensure a constant pressure difference between the high and low pressure reservoirs.

Figure 3:
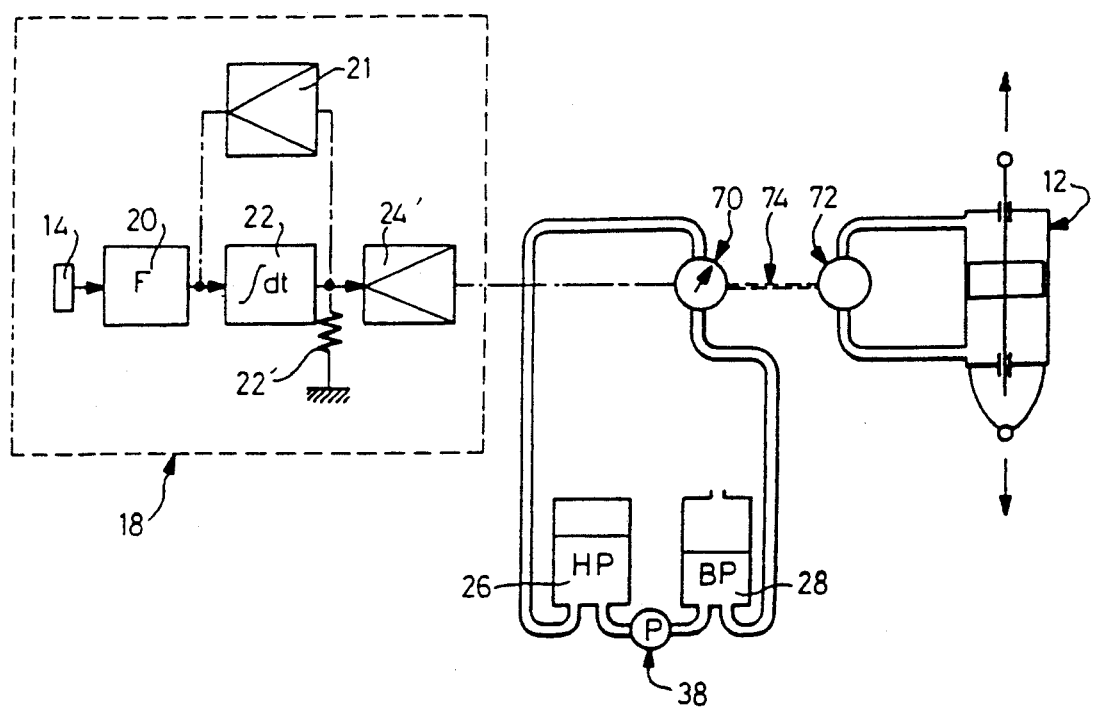
FIG. 3 is another diagrammatic view of a variant of the device shown in FIG. 2.

The device just described operates in accordance with the "off-on" principle with pulse width modulation. This device has the drawback, when associated with a body inclining device, of transmitting forces which, by their discontinuity, may be found to be unpleasant for the passengers. In this case, the constructional arrangements shown in FIG. 3 may be employed.

In this case, the switching system employing directional-control valves is replaced by two hydraulic motor-pumps 70 and 72 mechanically interconnected by a shaft 74 and hydraulically connected, motor-pump 70 to the high and low pressure reservoirs 26 and 28, and motor pump 72 to the two chambers of the double-acting cylinder 12. Motor-pump 70 has a variable capacity which modified as a function of the output of the amplifier 24' whose cropping function has been eliminated relative to the cropping amplifier 24 employed in the preceding device. The other elements correspond to elements already described with reference to FIG. 2. Accordingly, the motor-pump 70 has a variable capacity which is controlled by the output signal delivered by the control circuit 18. Thus, according to the intensity of this signal, the shaft of motor-pump 70 (and thus the shaft 74 and that of motor-pump 72) is subjected to a torque proportional to that signal. As the motor-pump 72 (with a fixed capacity) is subjected to this torque, it generates a difference of hydraulic pressure in the two chambers of the cylinder 12. Conversely, if a difference of pressure is created in the cylinder 12 due to a relative movement between the body and the rolling element of the car, this imposes a torque on motor-pump 72, which torque is transmitted via shaft 74 to motor-pump 70; the latter transforms this torque in a circulation of oil from one of the reservoirs to the other.

In another embodiment of the invention, the device may be integrated into the wheel bearing.

In this embodiment, the device maintains constant the forces on the rail, but not the body suspension.

It is clear that the device, as described with reference to FIGS. 1 and 2, permits notably improving the comfort of the passengers for passenger rolling stock, but it only moderately attenuates the variations in the loads applied to the track, above all at high speed. Indeed, the principal component of the latter comes from the forces of inertia applied to the unsuspended masses, in particular the axles and the masses attached thereto with no elastic intermediate components. A solution which is more expensive than the conventional solution, but effective both from the point of view of the body suspension and from the point of view of the small transmission of forces to the rails and to the rolling elements themselves, consists in damping the oscillations at the source, i.e. in the region of the rolling elements themselves, at least as concerns the vertical oscillations of the wheel which are the most harmful in their effects.

An additional advantage afforded by this last device resides in the fact that, in smoothing out the vertical wheel-rail reaction, in the extreme case, to solely the weight transmitted to the rail by the wheel in question, the adherence is improved both as concerns propulsion and braking: in other words, the invention enables the wheel to "stick to the ground" in an improved manner relative to conventional constructional arrangements.

The principle of the device consists in vertically throwing an intermediate mass smaller than the unsuspended mass "to be erased", with an acceleration which is at each instant opposed to that in respect of which the unsuspended mass is the center, the intensity of this acceleration communicated to the intermediate mass being greater than that of the unsuspended mass to be compensated for and as far as possible within the ratio of the masses concerned.

An embodiment of such a device is shown diagrammatically in FIGS. 4, 4A and 5.

The wheel 8 rolls along the rail 10 around the axle box 40 which constitutes the bearing of the axle. The axle box is connected to a dome-shaped housing 40' which is vertically above the axle box and contains the whole of the mechanical and electrical part of the compensating device except for an electric generator 58 which supplies power to the unit. In FIG. 4, this generator is fixed on the end of the axle and is driven by this axle. But it will be quite obvious that the electric supply may also be furnished by the general network supplying power to the vehicle in question. The assembly of the axle box 40 and housing 40' may be maintained relative to the vehicle by any suitable means, in particular by an axle box link 42 of conventional type, as shown in FIG. 4. The housing 40' also acts as a support for the spring of the body suspension 6.

The housing 40' moreover contains the accelerometer 14 responsive to the vertical accelerations and the electronic processing system 18' shown in FIG. 5 and referred to hereinafter.

The mass compensation is afforded by an inertia weight 44 which moves in the housing vertically about a mean position in a pulsating manner at the same rhythm as the vertical motions applied to the wheel but in the opposite direction and with larger amplitudes which are in the ratio between the wheel masses (or more exactly of the semi-axle equipped with all the component elements which form a unit therewith in its vertical motion) and the inertia weight. The latter is urged upwardly or downwardly by the oil pressure respectively introduced in the cylinders 46 and 48 of equal section in which respectively slide pistons 60 and 62 connected to the inertia weight. The oil in the high pressure state is stored in a reservoir 50 which has, in the version illustrated in FIG. 4, a toric shape. In the case of a large vertical acceleration, the oil is conveyed from this reservoir either to the cylinder 46 or to the cylinder 48, depending on the direction of the vertical acceleration, owing to action of the directional-control valves 30, 32 and 34 already referred to in respect of FIG. 2.

FIG. 4A represents the three possible configurations. At I, the acceleration of the wheel is in the upward direction (the wheel travels over a hollow): the HP reservoir communicates through the directional-control valve 30 with the upper cylinder 48. At II, the cylinders 48 and 46 communicate with each other through the directional-control valve 34. At III, in the case of the acceleration of the wheel in the downward direction (the wheel passes over a boss), the HP reservoir communicates with the lower cylinder 46 through the directional-control valve 32.

Independently of the accelerations, the inertia weight 44 is returned to its mean position by the action of two springs 52 and 54 and a calibrated but small escape passage arranged in a permanent manner between the cylinders 46 and 48. This escape passage, not shown in FIG. 4, may be provided between the input and the output of the valve 34 which is the bypass valve of the cylinders 46 and 48.

The low pressure oil is recovered at the bottom of the housing 40'. Possible leakages of oil between the inertia weight and the cylinders are likewise recovered at the bottom of the housing. A duct 56 formed in the inertia weight 44 constitutes indeed a drain for exhausting any oil leakages in the upper cylinder 48.

In operation, the motions of the wheel and the inertia weight have the effect of inflating the high pressure reservoir 50.

After the actual tests, it will be possible to decide whether it is advisable to provide an inflating pump 50' in addition to the natural inflation.

In FIG. 5 there will be found a processing circuit similar to that described with reference to FIG. 2 but simplified, since there is no longer an integrator: indeed, it is the acceleration parameter rather than the velocity parameter which is the principal control parameter. As before, the suitability of the filter 20 at the output of the accelerator will be decided after experimental tests of the device. The performance of the control may be improved by the anticipation of the motion issuing from the motion of the preceding wheel on the same rail line introduced through the input 76.

A remark may be made concerning the system described hereinbefore:

If there are neglected the compressibility of the oil and its inertia, the elasticity of the mechanical elements and the pressure drops in the piping and valves, it may be considered that the compensating force directed upwardly or downwardly is constant in intensity (since it is equal to the force exerted by the high pressure on the section of the cylinders 46 and 48 as long as the high pressure remains constant) and not proportional to the vertical acceleration of the wheel. The proportionality effect may however be obtained, on one hand, by a time modulation with short pulses of the signal in the processing circuit and, on the other hand, by the smoothing effect created by the fluid and solid elasticities which it will be possible to adjust if need be by the introduction of elastic spacer blocks in the upper part of the cylinders 46 and 48.

In a still further embodiment, it is possible, at the price of a certain additional complication of the device described with reference to FIGS. 4, 4A and 5, to ensure not only the constancy of the forces exerted on the rail, notwithstanding the unevennesses of the latter, but also the body suspension, at least as concerns the vertical motions.

Figure 6:
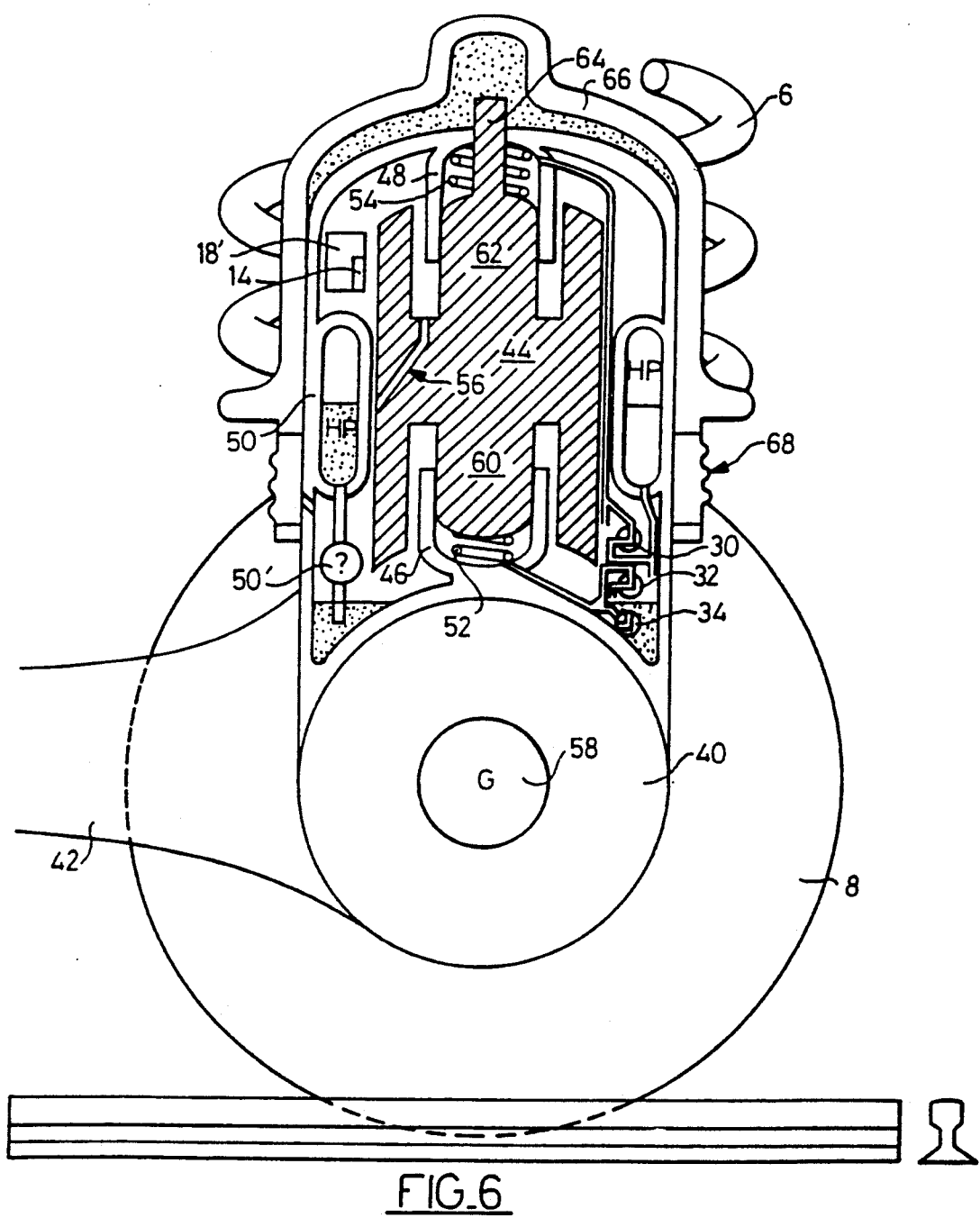
FIG. 6 is a view similar to FIG. 4 of another version of the device which permits both smoothing out the forces on the track and calming the body accelerations.

FIG. 6 represents the compensation device improved in this way. It is derived from that represented in FIG. 4. The common elements performing the same functions are designated by the same references and do not require further description.

However, note that, contrary to the case of the device of FIG. 4, the upper piston 62 of the inertia weight 44 terminates in a needle or point, designated by the reference numeral 64 in FIG. 6 and extending through the bottom of the cylinder 48. In contrast to the case represented in FIG. 4, the cylinders 46 and 48 no longer have the same cross-sectional area: indeed, this time it is the annular section between the inner surface of the cylinder and the outer surface of the needle 64 which is equal to the area of the internal cross-section of the cylinder 46 so that, at a given high pressure of the oil, the inertia weight is still thrown with the same acceleration in the upward or downward direction depending on whether it is the valve 32 or the valve 30 which is opened. The housing unit 40' is surmounted by a bell-shaped cap 66 which slides on the housing 40', the latter acting as a piston while the cap 66 acts as a cylinder, the space between these two solid elements being filled with oil. The whole of the car is carried by the cap 66 through the spring 6 bearing against the flange of the cap which also performs the function of a hydraulic cylinder.

It can easily be shown that if the ratio of the areas of the cross-sections of the sliding surfaces of the needle and cap are in the ratio $m/M+m$, m designating the mass of the inertia weight and M that of the mass to be compensated, the vertical geometrical imperfections of the rail are compensated for in the region of the cap. The vehicle which rests on this cap no longer senses the vertical defects of the rail. The suspension may be arranged in accordance with solely other essentially aerodynamic disturbances.

As in the case of the device described with reference to FIG. 4, hydraulic leakages may be recovered at the bottom of the housing 40', including those which are liable to occur between the cap and the housing by means of a bellows 68.

Further, the cap 66 is to be maintained at a substantially constant height with respect to the housing 40' bis. This may be achieved by means of ducts having a low flow between the high pressure oil reservoir and ports formed in the sliding walls of the cap. This level detector is not shown in FIG. 6.

The degassing systems are not shown in this Figure either.

Lastly, two detected data are of interest and may be transmitted to a central microprocessor for well-determined needs; it concerns:

the vertical acceleration measured by the accelerometer 14, the oil pressure measured under the cap 66, this pressure representing the thrust of the loads placed on top of the considered rolling element.

The device described with reference to FIG. 6 is the most complete in that it safeguards to the maximum extent the comfort of the passengers (or more generally the accelerometric calm if it is intended to transport both passengers and merchandise), the forces exerted on the rail and the adherence as concerns traction and braking. But it is also the most complicated. Without departing from the scope of the invention, one of these three advantages may be given up.

The device described with reference to FIG. 1 only took into account the comfort of the passengers. It is possible to also obtain maximum adherence without having to be preoccupied by the arrangement of the rails. For this purpose, it is sufficient to add to the device described with reference to FIG. 1 a device modulating the traction —or braking—force in proportion to the vertical acceleration of the wheel measured by an accelerometer connected to the axle box. To constitute such a device, there must then be arranged:

an accelerometer having a substantially vertical axis installed on each axle box;

that the traction or braking force be exerted in an autonomous manner for each of the wheels (possibly for each of the axles in the case where the vertical acceleration of the two axle boxes are added together) in proportion to the rail-wheel vertical forces; and that all of the elements involved in the traction and braking have a sufficiently rapid reaction so that the forces may be effectively modulated at the rhythm of the rail-wheel forces (which excludes practically all power elements other than electrical or hydraulic elements).

We claim:

1. Method of damping motions of bodies and axles of railway vehicles by a damping system including an accelerometer emitting signals responsive to directions of motion to be damped, a circuit for processing the signals from the accelerometer and emitting processing signals, a hydraulic double-acting cylinder interposed between one of the bodies and one of the axles, and a piston slidingly mounted in the cylinder and dividing the cylinder into two chambers on opposite sides of the piston, the method comprising:

selectively feeding one of said chambers of said cylinder with oil from a reservoir of oil under pressure in response to said processing signals from said processing circuit; and automatically regenerating at least a part of the pressure in said oil reservoir by relative motion between said one body and said one axle.

2. The method as claimed in claim 1 and further comprising:

providing a pump connected to said oil reservoir; and operating said pump to complete the automatic regeneration of the pressure in the reservoir of oil under pressure.

3. The method as claimed in claim 1 and further comprising:

mounting the damping system in a housing connected to a wheel bearing on an axle;

providing an inertia weight as the piston of the hydraulic double-acting cylinder; and dampening vertical motions having a pulsating character, generated by rolling elements and forces exerted between a respective wheel and rail, by a compensatory effect of the inertia weight effecting vertical motions and contrary to said vertical motions generated by the rolling elements and by the wheel.

4. The method as claimed in claim 3 and further comprising:

recovering in a lower part of the damping system leaked oil; and recycling said recovered oil in the damping system.

5. In a damping system for damping motions of bodies and axles of railway vehicles by a damping system including an accelerometer for emitting signals responsive to directions of motion to be damped, a circuit for processing said accelerometer signals and emitting processing signals, at least one hydraulic double-acting cylinder means interposed between one of said bodies and one of said axles, and a piston slidingly mounted in said cylinder means and providing two chambers on opposite sides of said piston, the improvement comprising:

a reservoir means for oil under pressure;

means for selectively communicating said oil in said reservoir with one of said chambers of said cylinder means in response to processing signals from said processing circuit; and means for automatically regenerating at least a part of the pressure in said reservoir means by relative motion between said one body and said one axle.

6. The damping system as claimed in claim 5 wherein:

said reservoir means comprises a high pressure reservoir and a low pressure reservoir;

said means for selectively communicating said oil in said reservoir means with one of said chambers comprises at least two directional-control valves; and fluid circuit means are provided connecting said pressure reservoirs to said at least two valves and connecting said at least two valves to said two chambers, so that said at least two valves selectively control hydraulic switching between said two chambers and said high and low pressure reservoirs in response to said signals from said processing circuit.

7. The damping system as claimed in claim 6 and further comprising:
a third directional-control valve hydraulically coupled with said at least two directional-control valves and said two chambers of said cylinder means for selectively communicating said two chambers with said reservoirs and isolating said two chambers from said reservoirs.

8. The damping system as claimed in claim 5 wherein:
a wheel bearing means is provided on each end of each axle;
a housing means is provided on each wheel bearing means;
said cylinder means comprises two opposed cylinders on said housing means; and
said piston comprises an inertia weight freely movably mounted in said housing in said opposed cylinders so that one of said two chambers is in one of said opposed cylinders and the other of said two chambers is in the other of said opposed cylinders for constituting said double-acting cylinder means.

9. The damping system as claimed in claim 8 and further comprising:
spring means engagable with said housing means for resiliently supporting said body on said housing means.

10. The damping system as claimed in claim 6 and further comprising:
spring means engagable with said housing means for resiliently supporting said body on said housing means.

11. The damping system as claimed in claim 7 wherein:
a wheel bearing means is provided on each end of each axle;
a housing means is provided on each wheel bearing means;
said cylinder means comprises two opposed cylinders on said housing means; and
said piston comprises an inertia weight freely movably mounted in said housing in said opposed cylinders so that one of said two chambers is in one of said opposed cylinders and the other of said two chambers is in the other of said opposed cylinders for constituting said double-acting cylinder means.

12. The damping system as claimed in claim 11 and further comprising:
spring means engagable with said housing means for resiliently supporting said body on said housing means.

13. The damping system as claimed in claim 10 wherein:
said accelerometer, high and low pressure reservoirs, and said directional-control valves, are disposed in said housing.

14. The damping system as claimed in claim 12 wherein:
said accelerometer, high and low pressure reservoirs, and said directional-control valves, are disposed in said housing.

15. In a damping system for damping motions of bodies and axles of railway vehicles by a damping system including an accelerometer for emitting signals responsive to directions of motion to be damped, a circuit for processing said accelerometer signals and emitting processing signals, at least one hydraulic double-acting cylinder interposed between one of said bodies and one of said axles, and a piston slidingly mounted in said cylinder means and providing two chambers on opposite sides of said piston, the improvement comprising:
a reservoir means for oil under pressure;
a first motor-pump having a variable capacity;
means for connecting said first motor-pump to said oil reservoir means;
means for connecting said first motor-pump to said processing circuit so that said variable capacity of said first motor-pump is adjusted as a function of said processing signal from said processing circuit;
a second motor-pump mechanically interconnected with said first motor-pump so that said second motor-pump is driven by said first motor-pump; and
hydraulic circuit means for connecting said second motor-pump to said two chambers of said cylinder so that a continuous application of forces produced by said double-acting cylinder is obtained.

* * * * *